March 11, 1924. Re. 15,793
W. J. LUSE
AUTOMATIC FIRE ALARM
Original Filed Nov. 20, 1918
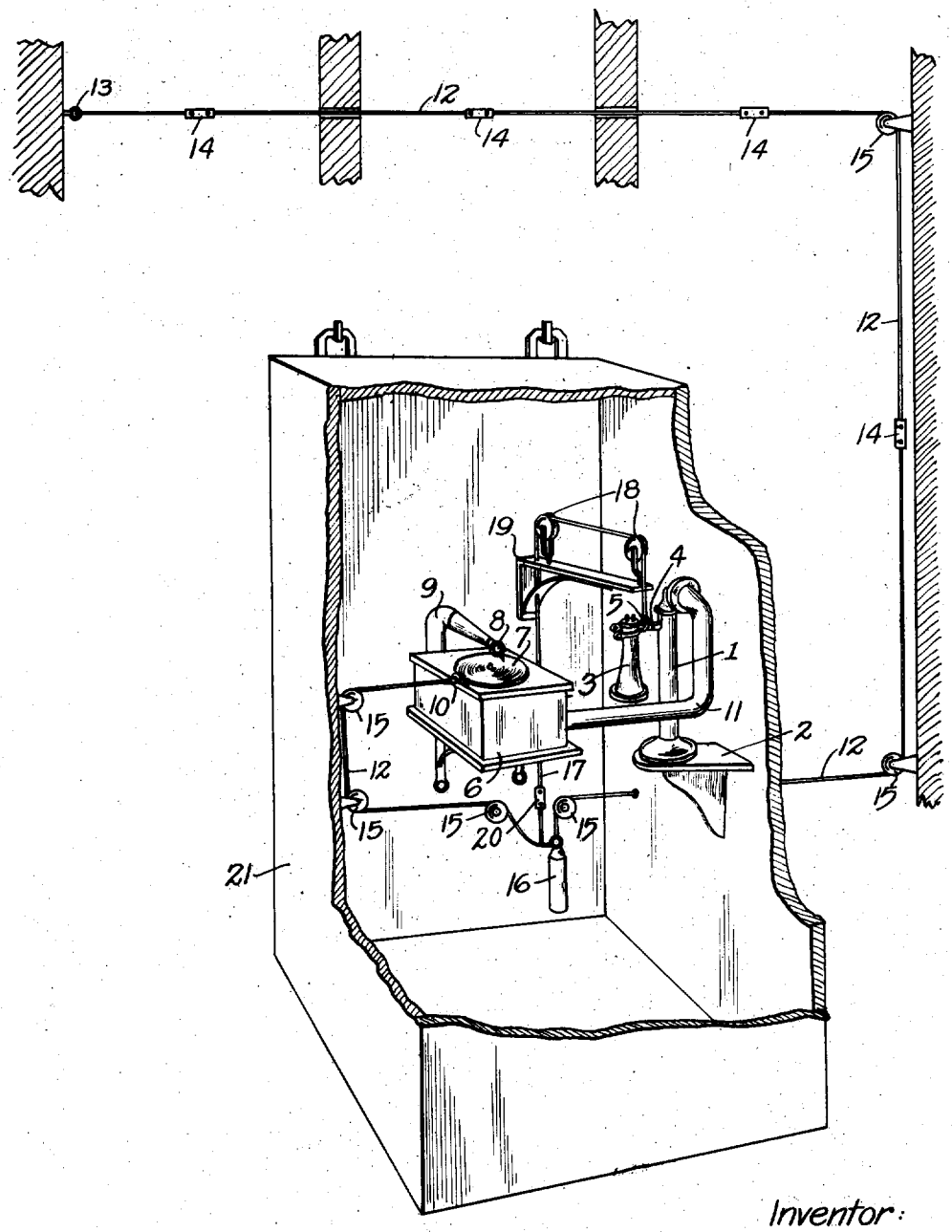
Inventor:
William J. Luse
By Johnet & Dearmer
Attorney Reissued Mar. 11, 1924. Re. 15,793

UNITED STATES PATENT OFFICE.

WILLIAM J. LUSE, OF NEW YORK, N. Y.

AUTOMATIC FIRE ALARM.

Original No. 1,344,701, dated June 29, 1920, Serial No. 263,293, filed November 20, 1918. Application for reissue filed March 17, 1922. Serial No. 544,635.

*To all whom it may concern:*

Be it known that I, WILLIAM J. LUSE, a citizen of the United States, residing in the city of New York, borough of Manhattan, county and State of New York, have invented a certain new and useful Automatic Fire Alarm, of which the following is a specification.

This invention relates to alarms, having reference particularly to an automatic alarm system.

The invention has for an object the provision of automatic means for notifying a station (remote from the location wherein the apparatus is installed) that abnormal conditions exist at such location.

A further object of the invention being to provide means for actuating the alarm mechanism, and automatic means for returning said mechanism to inactive condition.

From a structural standpoint, the invention, in its generic aspect, embodies means, adapted under certain predetermined conditions to operate the alarm, or give a signal, and, in the preferred embodiment of the invention, the signal is automatically communicated to a central station.

In carrying out my invention, I provide a normally inactive mechanism, comprising a sound producing device, as a phonograph, a sound transmission device, as a telephone, and automatic means for coincidentally actuating the sound producing device and placing the sound transmission device in active condition, and means for automatically restoring the alarm to inactive condition.

In the preferred and more specific form, the invention embodies a chain or cable which supports a weight in elevated position, said chain or cable being provided with a fusible link which becomes disrupted upon the temperature reaching the predetermined melting point of the fusible solder of the link, whereupon the weight falls and performs two functions, namely: it releases a brake on a phonograph positioned in proximity to a telephone and elevates the receiver of the phone, whereby the special message on the phonograph record is automatically transmitted to the transmitter of the phone and thence to the central phone station. The central station can then notify the fire department. Means is preferably provided whereby, at a subsequent period, dependent on the melting of a fusible link, the solder of which melts at a higher temperature than that of the first link, the telephone receiver is restored to its normal, hung-up position.

Features of the invention other than those specified, will be apparent from the hereinafter detailed description taken in conjunction with the accompanying drawings.

In the accompanying drawings, I have illustrated one practical form of the invention, but the construction shown therein is to be understood as illustrative only, and not as defining the limits of the invention.

The drawing is a perspective view of the complete apparatus, positioned within a casing, a portion of which latter is broken away.

Referring to the drawings, 1 is a telephone, positioned, for convenience, on a shelf or bracket 2, the receiver being designated 3 and the receiver support 4, the latter being associated with a ring, or equivalent device 5, for the purpose hereinafter described. A phonograph sound box is shown at 6, the record being designated 7, the reproducer 8 and the tone arm 9. The phonograph is provided with a brake or stop, in the form of a pin 10, extendible into a depression in the record support. The box has a suitable horn or tube 11 extending therefrom and leading to the mouth of the receiver of the telephone 1.

A main chain or cable 12, fixed at one end, as indicated at 13, is provided with a plurality of spaced fusible links 14, disruptable at a predetermined temperature, e. g., 145 degrees F. The other end of the cable is attached to the outer end of the brake or pin 10 on the phonograph. Cable 12 extends over guide pulleys 15 as shown, and at one point in the cable, preferably near its lower end, is suspended a weight 16. A branch chain or cable 17 extends upwardly from the main cable, thence over guide pulleys 18 mounted on bracket 19, whereupon its end is attached to ring 5 on receiver support 4. This branch cable is provided with a fusible link 20, the temperature of disruption of which is somewhat higher than that of fusible links 14; e. g., it might be 160 F. The reason for the difference in temperature will be explained later.

The apparatus described is preferably housed in a casing 21, in the interest of attractiveness and protection, although it will be understood that said casing does not necessarily function with the fire alarm apparatus. The record 7 may be made of steel to render it fire-proof, or, if an ordinary record is employed, it may be protected by a fire-proof metal casing, not shown.

From the foregoing description, the operation of the apparatus in sounding an alarm will be readily understood, but may be briefly described as follows: Assuming the telephone to be in normal, non-operating position, the phonograph wound up and the brake in operative position, a rise in temperature of the room or other location in which the disrupting element may be placed, to a temperature at which the links 14 disrupt, will cause the weight 16 to drop, thereby exerting a downward pull on that end of the main cable 12 which is attached to the brake 10 of the phonograph, thereby releasing the brake and setting the phonograph in operation. The downward movement of weight 16 simultaneously exerts a downward pull on branch cable 17, thereby elevating the receiver support 4 through the medium of rings 5, and thus putting the phonograph in communication with the telephone through the horn or pipe 11. The result is that the notation on the phonograph record 7 is communicated to the local telephone 1, through the horn 11, and thereupon transmitted to the central station. The record 7 will be provided with an approximate notation to indicate that a fire has broken out in the location where the apparatus is installed, such as "A fire has broken out in room 1009, 277 Broadway". This notation may be duplicated on the record, so as to cause a repetition thereof as often as desired. In the meantime, as the temperature rises, the fusible link 20 in branch cable 17 becomes disrupted, thereby freeing the branch cable from the action of weight 16, with the result that the upward pull on receiver support 4 ceases, whereupon the receiver drops by gravity, thereby shutting off 'phone communication with the central station. In the meantime, however, central station is presumed to have notified the fire department or, as will be obvious, if special wiring is provided, a particular fire department might be notified directly.

It will be obvious that slight changes may be made in the apparatus described, such as the substitution of equivalents, or that part of the apparatus specified might be used either alone or in other relations, without necessarily employing them all in conjunction, without departing from the spirit or substance of the invention, the scope of which is commensurate with the appended claims.

What I claim as new and desire to cover by Letters Patent is:—

1. In an automatic fire alarm, a cable adapted to hold a weight in suspension, a fusible link positioned in said cable, whereby when the link is disrupted by heat the weight falls, a phonograph, a telephone in proximity thereto, means whereby the falling of the weight releases a brake on the phonograph, thereby permitting it to operate and, simultaneously lifts the receiver of the phone whereby the message of the phonograph is sent into the phone and means for subsequently restoring the receiver to hung-up position.

2. In an automatic fire alarm, a cable adapted to hold a weight in suspension, a fusible link positioned in said cable, whereby when the link is disrupted by heat the weight falls, a phonograph, a telephone in proximity thereto, means whereby the falling of the weight releases a brake on the phonograph, thereby permitting it to operate, and simultaneously lifts the receiver of the phone whereby the message of the phonograph is sent into the phone, means for subsequently restoring the receiver to hung-up position, in combination with a fire protecting casing for the phonograph.

3. In an automatic fire alarm, a cable adapted to hold a weight in suspension, a fusible link positioned in said cable, whereby when the link is disrupted by heat the weight falls, a phonograph, a telephone in proximity thereto, means whereby the falling of the weight releases a brake on the phonograph, thereby permitting it to operate, and, simultaneously lifts the receiver of the phone whereby the message of the phonograph is sent into the phone, means for subsequently restoring the receiver to hung-up position, in combination with a fire protecting casing for the phonograph and a sound transmission conduit extending from the phonograph to the telephone.

4. In an automatic fire alarm, a cable adapted to hold a weight in suspension, a fusible link positioned in said cable, whereby when the link is disrupted by heat the weight falls, a phonograph, a telephone in proximity thereto, means whereby the falling of the weight releases a brake on the phonograph, thereby permitting it to operate, and, simultaneously lift the receiver of the phone whereby the message of the phonograph is sent into the phone, and means, cooperating with a second fusible link, disruptable at a higher temperature than the first link, for restoring the telephone receiver to hung-up position.

5. In an automatic fire alarm, a telephone transmitter associated with a communicating current leading to the central office, an audible alarm cooperating with the telephone transmitter, means for normally restraining the operations of the audible alarm, and maintaining the telephone inoperative except in the event of fire, means operable by a predetermined rise in temperature for rendering the telephone transmitter operative and releasing the audible alarm for operation, and means operable upon a further rise in temperature for restoring the telephone transmitter to inoperative condition.

6. In an automatic fire alarm, an alarm, normally held in restraint, means operable upon a predetermined rise of temperature to release the alarm and allow the same to operate, means for transmitting the alarm to a central station, said means being normally maintained inoperative by the means which restrains the alarm, but adapted to be rendered operative simultaneously with the releasing of the alarm, and means operable upon a further rise in temperature for restoring the alarm transmitting means to inoperative condition.

7. In an automatic fire alarm, means controlled by a predetermined rise in temperature for transmitting an alarm, and means controlled by a still higher rise in temperature for restoring the alarm to inoperative condition.

8. In an automatic fire alarm, means for transmitting an alarm to a distant station, means for normally withholding the alarm, means operable upon a predetermined rise in temperature for releasing the alarm and allowing its transmission, and means operable upon a still further rise in temperature for restoring the alarm to inoperative condition.

9. In an automatic alarm, means adapted to hold a weight in suspension, a fusible link positioned in said means, whereby when the link is disrupted by heat the weight falls, a phonograph, a telephone in proximity thereto, means whereby the falling of the weight releases a brake on the phonograph, thereby permitting it to operate and simultaneously lift the receiver of the telephone, whereby the message of the phonograph is sent into the telephone, and means for subsequently restoring the receiver to hung-up position.

10. In an automatic alarm, a cable adapted to hold a weight in suspension, a fusible link positioned in said cable, whereby when the link is disrupted by heat the weight falls, a phonograph, a telephone in proximity thereto, means whereby the falling of the weight releases a brake on the phonograph, thereby permitting it to operate and simultaneously lift the receiver of the telephone, whereby the message of the phonograph is sent into the telephone, and means for subsequently restoring the receiver to hung-up position.

11. In an automatic alarm apparatus, means for holding a weight in suspension, disrupting means positioned in said first means whereby, when disrupted, the weight falls, a phonograph, a telephone in proximity thereto, means whereby the falling of the weight releases a brake on the phonograph and coincidentally lifts the receiver of the telephone, whereby the message of the phonograph is sent into the telephone, and means for subsequently restoring the receiver to hung up position.

12. In an automatic alarm apparatus, means adapted to hold a weight in suspension, disrupting means positioned in said first named means whereby, when disrupted, the weight falls, a phonograph, a telephone in proximity thereto, means whereby the falling of the weight coincidentally releases a brake on the phonograph, allows its message to be repeatedly sounded and lifts the receiver of the telephone and means for subsequently restoring the receiver to hung up position.

Signed at New York, in the county of New York and State of New York, this 20th day of December, 1921.

WILLIAM J. LUSE.